(12) United States Patent
Drexel (10) Patent No.: US 11,493,140 B1
(45) Date of Patent: Nov. 8, 2022

(54) QUICK-RELEASE COVER FOR AIR RELEASE VALVE

(71) Applicant: Brian W. Drexel, Hawthorne, FL (US)

(72) Inventor: Brian W. Drexel, Hawthorne, FL (US)

( * ) Notice: Subject to any disclaimer, the term of this patent is extended or adjusted under 35 U.S.C. 154(b) by 0 days.

(21) Appl. No.: 17/868,059

(22) Filed: Jul. 19, 2022

Related U.S. Application Data (60) Provisional application No. 63/223,625, filed on Jul. 20, 2021.

(51) Int. Cl.
*F16K 27/12* (2006.01)
*F16K 24/04* (2006.01)
*B65D 51/16* (2006.01)
*F16K 3/18* (2006.01)

(52) U.S. Cl.
CPC .......... *F16K 27/12* (2013.01); *B65D 51/1633* (2013.01); *B65D 51/1644* (2013.01); *F16K 24/042* (2013.01); *F16K 3/18* (2013.01)

(58) Field of Classification Search
CPC .......... F16K 27/12; F16K 24/042; F16K 3/18; B65D 51/1633; B65D 51/1644
USPC ....... 220/293, 303, 324, 325, 203.19, 203.2, 220/203.22; 137/15.08, 315.08
See application file for complete search history.

(56) References Cited

U.S. PATENT DOCUMENTS

| 3,400,863 | A | * | 9/1968 | Brown | F16N 19/00 222/626 |
| 3,854,582 | A | * | 12/1974 | Martinelli | B65D 43/0225 206/508 |
| 4,333,580 | A | * | 6/1982 | Sweigart, Jr. | E04H 5/04 220/4.07 |
| 5,329,971 | A | * | 7/1994 | Condon | E03D 11/16 220/314 |
| 5,727,707 | A | * | 3/1998 | Wickland | B65D 85/82 220/641 |
| 5,992,671 | A | * | 11/1999 | Wardani | A47J 36/10 220/573.1 |

* cited by examiner

*Primary Examiner* — John Bastianelli
(74) *Attorney, Agent, or Firm* — Saliwanchik, Lloyd & Eisenschenk

(57) ABSTRACT

The problem of disassembling an air release valve in the field by removing the valve cover to remove the internal working components is solved by a quick release mechanism on the valve cover that can be operated by hand. The quick release mechanism can include a radially tapered groove with tapered parallel tracks that define a slot in the valve cover and a guide on the valve body that engages with the tracks through the slot. The guide can be inserted into a socket in the radially tapered groove and a shoulder piece on the guide can slide on the tapered parallel tracks, which brings the valve cover towards the valve body. An O-ring and a U-cup seal arranged in recesses in the valve body can be compressed by the valve body cover to form airtight seals and the shoulder piece can be lodged in a locking pocket to keep the valve cover in place.

20 Claims, 8 Drawing Sheets

QUICK-RELEASE COVER FOR AIR RELEASE VALVE

CROSS-REFERENCE TO RELATED APPLICATIONS

This application claims priority to U.S. Provisional Patent Application Ser. No. 63/223,625, filed Jul. 20, 2021, which is incorporated herein by reference in its entirety.

BACKGROUND OF INVENTION

An automatic air release valve is a hydromechanical device that allows accumulated air or gases to be released from pressurized pipeline systems used to convey a liquid. Most air release valves have the following components: a valve body, a valve cover with an exhaust orifice, a compression seal between the valve body and valve cover, and a linkage mechanism with a plug and an attached float. The air release valve functions automatically via the float and plug components, while the pipeline is in operation and under pressure. The air release valve has an exhaust orifice that is controlled by an internal plug that opens automatically when sufficient air and gas have accumulated in the valve body and is closed automatically after sufficient air and gas has been exhausted from the valve body through the exhaust orifice.

Most air release valves are comprised of a valve body that contains a float attached to a linkage mechanism and a valve cover with the exhaust orifice or venting hole therein. Conventional designs connect the valve cover to the valve body with bolts, usually four bolts, which compresses a gasket or O-ring seal between the valve cover and valve body to form a seal.

The linkage mechanism is typically a compound lever with a float ball attached on the terminal end. This float and linkage mechanism is typically attached to the underside of the valve cover and can be removed with the valve cover. The linkage mechanism can have a flexible seat arranged on the compound lever and opposite the float. The float resides on the liquid within the air release valve. As the valve body fills with the liquid, air and gases in the liquid (water for example), accumulate in the top of the air release valve. When too much air and gas accumulate the fluid level drops in the air release valve which causes the float to drop until it pulls the plug away from the exhaust orifice to vent the air release valve allowing liquid to rise in the air release valve and raise the float to a level that pushes the plug back against the exhaust orifice.

As part of routine maintenance in the field, especially when used on wastewater pipelines, air release valves are backflushed with clean water. If the air release valve is equipped with a backflush attachment, this process requires closing off the air release valve from the pipe and flushing with clean water by attaching additional hoses and additional ball valves to control the flow of clean water inside the air release valve. Otherwise, the valve cover must be removed from the valve body to perform maintenance. When there are multiple air release valves to be maintained, this process of disassembling and reassembling the air release valve can be time-consuming, particularly in securing a proper seal between the components.

It would be helpful if the valve cover could be easily and quickly removed and replaced, particularly for air release valves are not equipped with a backflush attachment. There is a need in the industry for an air release valve having a valve cover that can be removed and replaced quickly and accurately by hand, without the need for tools, and that automatically ensures a proper seal between components.

BRIEF SUMMARY

The subject invention provides a quick release mechanism to address the problem of forming an air-tight seal between two components without the use of tools or other devices. In particular, the problems associated with disassembling or opening an air release valve in the field by removing the valve cover and replacing the valve cover to create an air-tight seal with the valve body is solved by providing the air release valve cover with a quick-release mechanism.

The quick release mechanism of the subject invention allows the valve cover to be removed and replaced on a valve body by hand, without the need for additional tools. Advantageously, the quick release mechanism facilitates creating a proper seal between two surfaces when the valve cover is reconnected to the valve body. The air release valve quick release mechanism of the subject invention employs a unique design that interlocks a first component of the air release valve with a second component of the air release valve. More specifically, the quick release mechanism can be beneficially incorporated with a valve cover and a valve body of an air release valve. Advantageously, the quick release mechanism can be engaged and disengaged by hand and does not require additional tools or attachments. Embodiments of the new quick release design employ a valve cover with at least one, preferably at least two, semi-circular or radially tapered grooves. The valve body can have guides that engage with the radially tapered grooves to press a surface of the valve cover against at least one compression seal and a surface of the valve body when the valve cover is rotated.

Initially, a guide is inserted through open sockets in the radially tapered grooves to align the valve cover with the valve body, with the two surfaces to be sealed facing each other. When the guide is inserted into the socket of the radially tapered groove, the valve cover can be rotated causing a slot in the radially tapered groove to slide past or around the guide with a shoulder piece on the guide sliding on parallel tracks in the radially tapered groove on each side of the slot. The parallel tracks can have an upward taper, or an angle of inclination, so that as the shoulder piece moves away from the socket and towards a locking pocket, when the valve cover is rotated, the shoulder piece is drawn upwards in the radial tapered groove and the valve cover is simultaneously pulled downwards through the full travel of the tapered parallel tracks. When the shoulder piece reaches the top of parallel tracks, the valve cover can be pressed fully against the valve body, thereby compressing at least one compression seal situated in one or more recesses in the valve body. When the valve cover is further rotated, the shoulder piece comes off or disengages from the parallel tracks and drops or becomes seated or lodged in the locking pocket. The at least one compression seal can have a durometer that allows it to be temporarily deformable but expands to maintain an upward pressure on the valve cover, which applies force against the valve cover and assists in keeping the shoulder piece engaged in the locking pocket and create a seal with the valve body. Likewise, the locking pocket and the pressure exerted by the compression seal act to lock the valve cover in place and maintain an air-tight seal between the valve cover and the valve body.

Pushing down on the valve cover can temporarily deform or compress the compression seal, raising or dislodging the shoulder piece up from the locking pocket, and rotating in the opposite direction, or towards the parallel tracks, can disengage the shoulder piece from the locking pocket. As the valve cover continues to be rotated the parallel tracks move downward and away from the guide and the guide is returned to the socket, so the valve cover can be raised and removed from the valve body.

Advantageously, air release valves with the quick release mechanism of the subject invention can internally utilize conventional linkage mechanisms and compression seals. An air release valve with a quick release mechanism of the subject invention can eliminate the need for external bolting of the valve cover.

While the quick release mechanism can be utilized with any two components to be joined or sealed, it is particularly beneficial with air release valves that require the valve cover to be removed in the field, such as for maintenance or repair.

BRIEF DESCRIPTION OF DRAWINGS

In order that a more precise understanding of the above recited invention can be obtained, a more particular description of the invention briefly described above will be rendered by reference to specific embodiments thereof that are illustrated in the appended drawings. Certain drawings presented herein may be drawn to scale, but any reference to dimensions in the drawings or the following description is specific to the embodiment disclosed. Any variations of these dimensions that will allow the subject invention to function for its intended purpose are considered to be within the scope of the subject invention.

DETAILED DISCLOSURE

The subject invention provides a quick release mechanism, and methods of use, for linking or fastening together the surfaces of two components and, in certain embodiments, creating an air-tight seal between the facing surfaces. Embodiments of the quick release mechanism of the subject invention provide one or more radially tapered grooves that slidably engage with a guide. In a particular embodiment, the quick release mechanism is incorporated with a modified air release valve. Advantageously, the modified air release valve can be easily disassembled in the field without additional equipment or tools and can utilize conventional interior linkage mechanisms.

The subject invention is particularly useful in the field of pressurized pipeline systems, in particular air release valves utilized with pressurized pipeline systems, such as those employed by municipal water treatment systems. While the subject application describes, and many of the terms herein relate to, a use with air release valves used on pressurized pipeline systems, the subject invention can be utilized with any device where two components have surfaces to be joined or at least brought into close proximity to form an air-tight seal.

In the description that follows, terms are used in relation to air release valves and their use with pressurized pipe systems. To provide a clear and consistent understanding of the specification and claims, the following definitions are provided.

The term "linkage mechanism" is used herein to refer to conventional components located within an air release valve that operate to open and close an exhaust orifice through which air and gases that accumulate in the air release valve are vented. As used herein, these terms include a compound lever system, a float that raises and lowers within the air release valve to control the air exhaust, and a plug that opens and closes the exhaust orifice.

Furthermore, the terms "about" or "approximately," as used herein, are defined as at least close to a given value or either end of a range as is necessary to cover manufacturing variances, equipment tolerances, and normal variances in material, as understood by those skilled in the art. Thus, it should be understood that absolute accuracy is not required with respect to those aspects for the invention to operate. When the term "about" is used to describe a quantitative aspect of the invention the relevant aspect may be varied by up to ±10% (e.g., ±1%, ±2%, ±3%, ±4%, ±5%, ±6%, ±7%, ±8%, ±9%, or ±10%).

Also, as used herein, and unless otherwise specifically stated, the terms "operable communication," "operable connection," "operably connected," "cooperatively engaged" and grammatical variations thereof mean that the particular elements are connected in such a way that they cooperate to achieve their intended function or functions. The "connection" or "engagement" may be direct, or indirect, physical, or remote.

The figures and descriptions of the present invention have been simplified to illustrate elements that are relevant for a clear understanding of the invention, while eliminating, for purposes of clarity, other elements that may be well known. Those of ordinary skill in the art will recognize that other elements may be desirable and/or required in order to implement the present invention.

As used in the specification and in the claims, the singular for "a," "an" and "the" include plural referents unless the context clearly dictates otherwise.

The transitional term "comprising," which is synonymous with "including," or "containing," is inclusive or open-ended and does not exclude additional, unrecited elements or method steps. By contrast, the transitional phrase "consisting of" excludes any element, step, or ingredient not specified in the claim. The transitional phrase "consisting essentially of" limits the scope of a claim to the specified materials or steps "and those that do not materially affect the basic and novel characteristic(s)" of the claimed invention. Use of the term "comprising" contemplates other embodiments that "consist" or "consist essentially of" the recited component(s).

Reference will be made to the attached Figures on which the same reference numerals are used throughout to indicate the same or similar components. With reference to the attached Figures, which show certain embodiments of the subject invention, it can be seen that the subject invention comprises a quick release mechanism 300 for linking, fastening together or otherwise bringing into operable abutment two surfaces that face each and optionally forming a seal between facing surfaces on a first component 50 and a second component 75. In one embodiment, a quick release mechanism is incorporated with two components each having a facing surface to be linked or fastened together. In a particular embodiment, the quick release mechanism is incorporated with a modified air release valve 100 having a valve cover 120 is arranged at the proximal end 5 and a valve body 200 that is distal 10 to the valve cover. The valve cover can have one or more handles 124 and an exhaust orifice 122 extending through the valve cover to exhaust air from the valve body interior 205. Operably attached to a distal sealing surface 126 of the valve cover is a linkage mechanism 20 that operates to control the venting of air and gases through the exhaust orifice. The valve cover 120 is removably connected to the valve body via a quick release mechanism 300 with cooperating components on the valve cover and valve body. Within the valve cover there can be at least one, ideally at least two, radially tapered grooves 320. Each radially tapered groove has two parallel tracks 340 defining a slot 345 therebetween that opens onto the sealing surface. The parallel tracks can have an angle of inclination or a taper A1, so that one end of the parallel tracks is higher in the radially tapered groove than the opposite end. At the start of the taper A1-$a$ of the parallel tracks there is a socket 350 and at the end of the taper A1-$b$ is a locking pocket 360. The valve body 200 has an overhang 212 with an inner wall 213 and a slide surface 215 at a proximal end with a corresponding guide 400 extending proximally therefrom to rise above the slide surface 215. Each guide has a post 420 and a wider shoulder piece 430 at or about the proximal end. The guide engages with a radially tapered groove through the socket. Rotating the valve cover causes the shoulder piece to slide on the parallel tracks, which simultaneously pulls the valve cover towards the slide surface, due to the taper of the parallel tracks, until the shoulder piece reaches the locking pocket, in which the shoulder piece lodges or seats to inhibit the valve cover from rotating open. Each of these general components can have one or more sub-components, which will be discussed in detail below.

Air release valves utilized with pressurized pipeline systems, such as municipal water or sewage lines, are available in several materials, but the most common materials are cast or ductile iron, stainless steel, and plastic-type composite materials. The air release valve embodiments of the subject invention can be manufactured from the same materials as other air release valves for similar applications. In a particular embodiment, the components of the air release valve of the subject invention, including the valve cover, valve body, and linkage mechanism, are manufactured of stainless steel. In a specific embodiment, the stainless steel is Type 316SS. In another specific embodiment, the stainless steel is Type 304SS. In a further specific embodiment both Type 316SS and 304SS stainless steel are utilized for one or more components of the air release valve.

Figure 1:
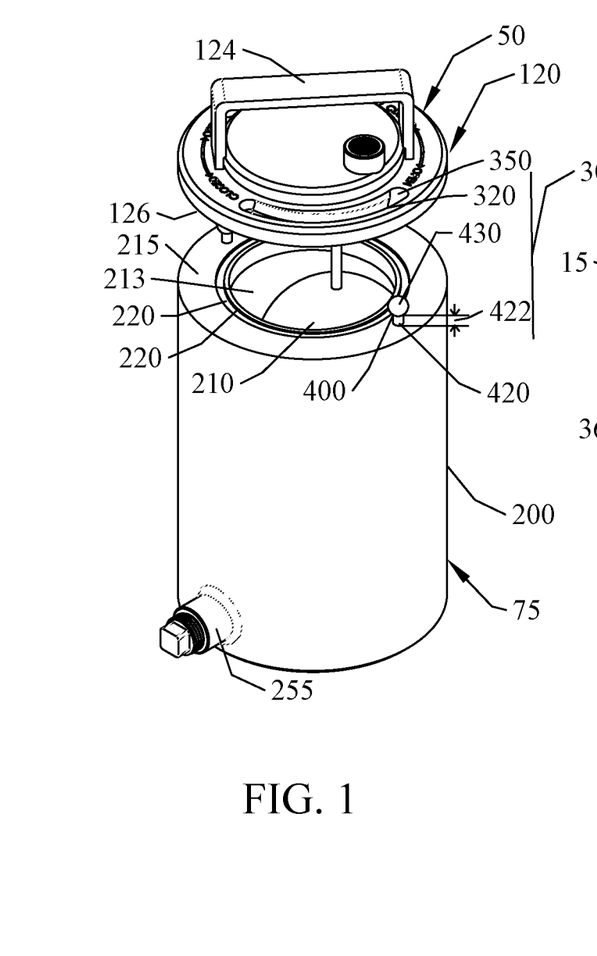
FIG. 1 is a perspective view of a disassembled air release valve with a first component and a second component that incorporate one embodiment of a quick release mechanism, according to the subject invention.
Figure 2:
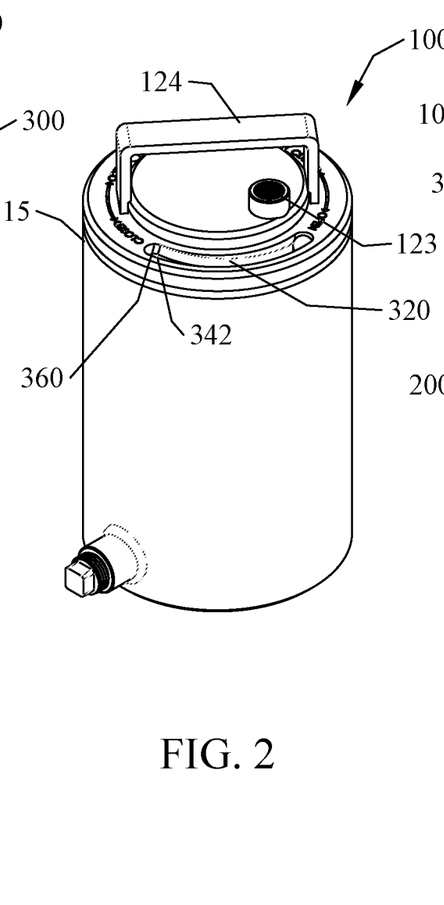
FIG. 2 is a perspective view of the assembled air release valve in FIG. 1.
Figure 3:
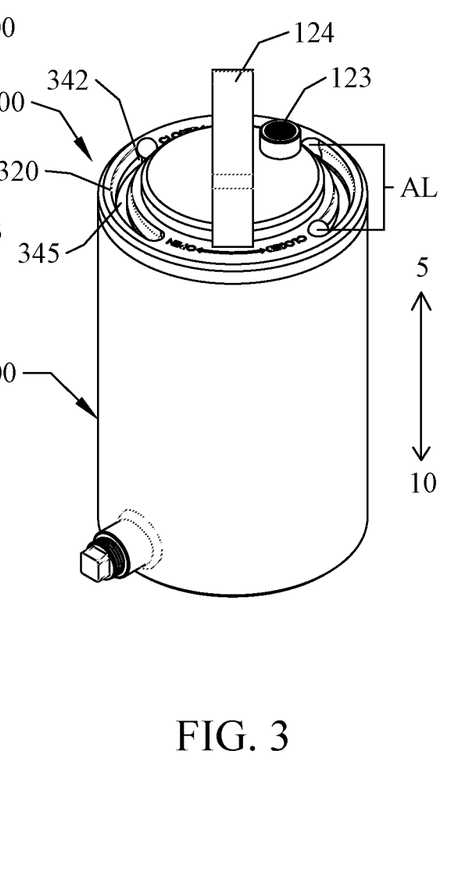
FIG. 3 is a perspective view of the assembled and locked air release valve in FIG. 1.
Figure 11:
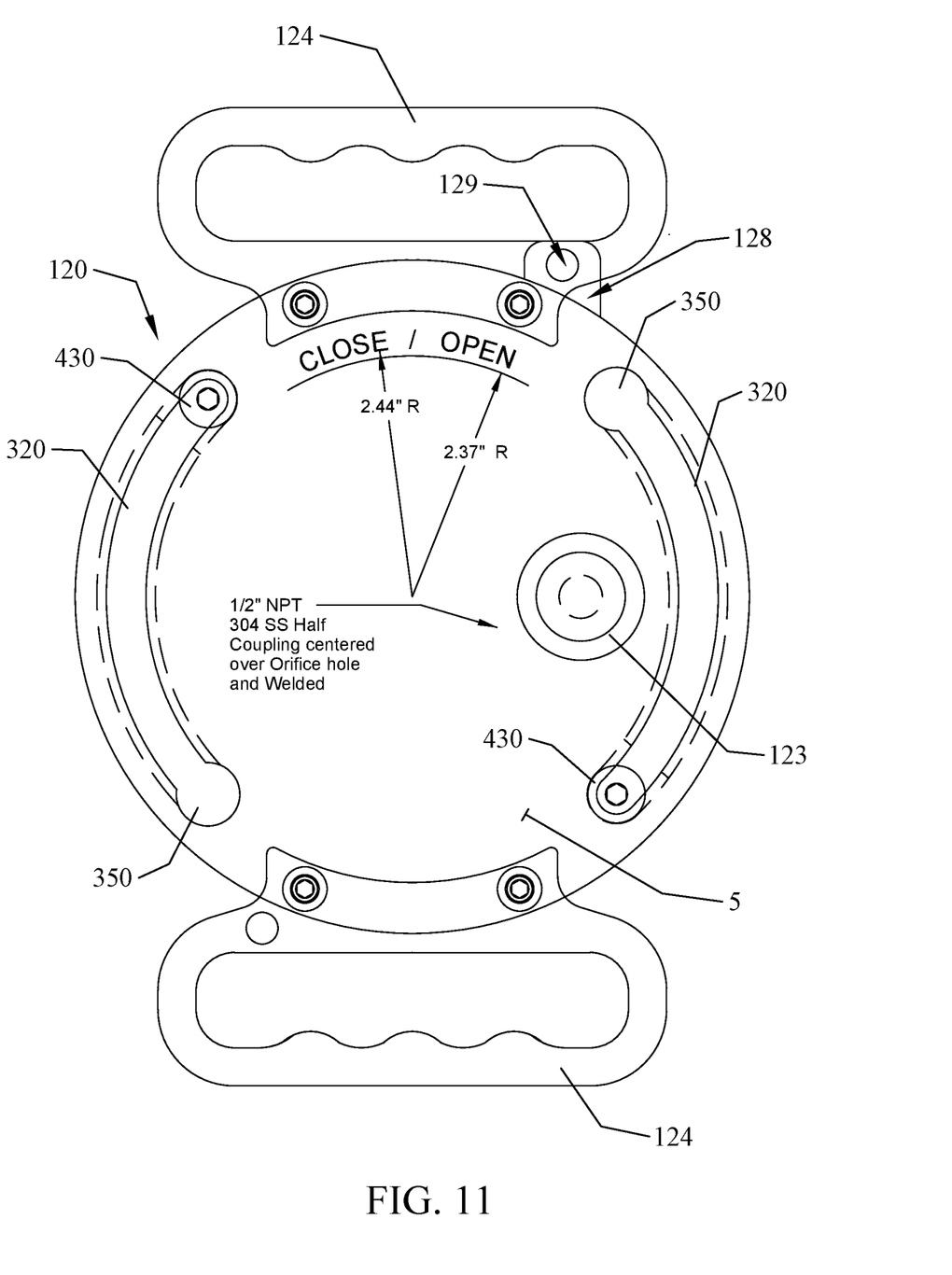
FIG. 11 is a top plan view of an alternative embodiment of the valve cover of the air release valve, according to the subject invention, having side handles arranged on the valve cover. Also shown is a lock flange that aligns with one of the side handles through which a locking device can be secured to inhibit removal of the valve cover.
Figure 12:
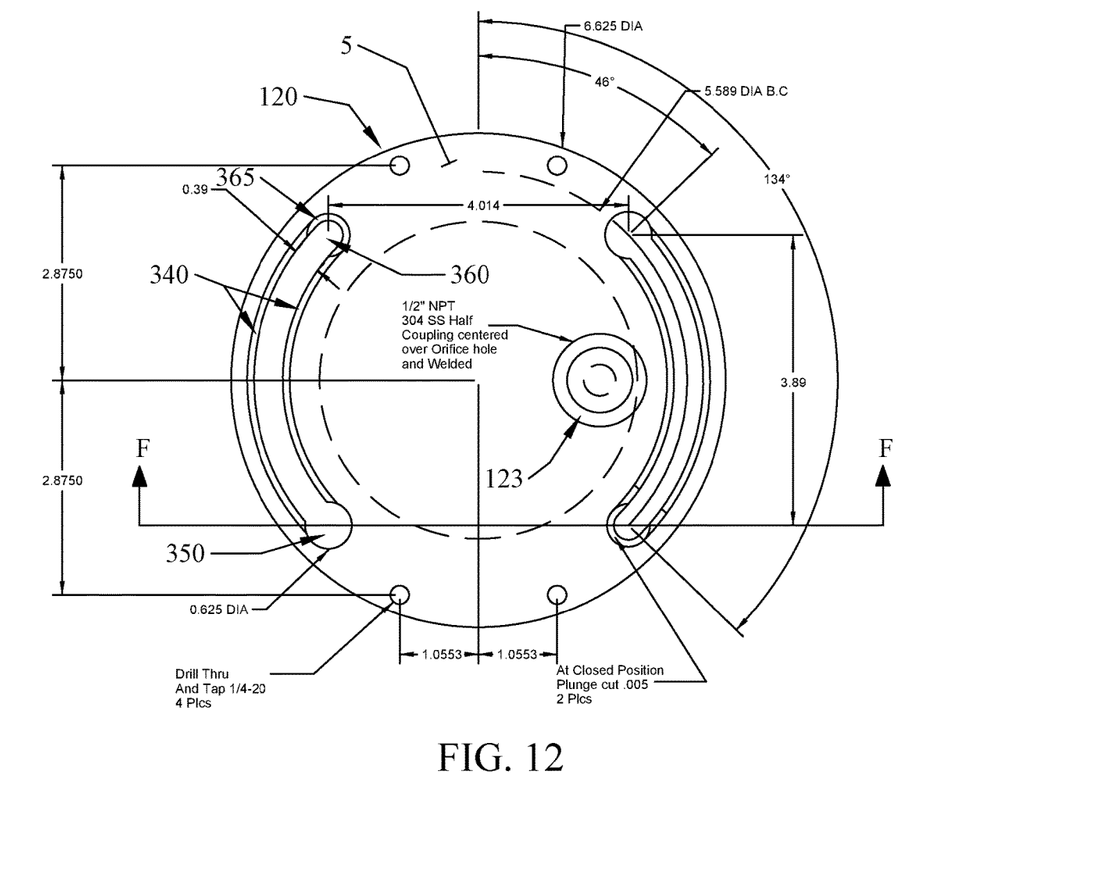
FIG. 12 is a top plan view of the alternative embodiment of the valve cover of the air release valve shown in FIG. 11. This embodiment shows attachment openings in the valve cover by which one or more side handles are attached to the valve cover. A lock flange can also be removably attached to the valve cover to inhibit removal of the valve cover. The lock flange can be attached utilizing the attachment openings in the valve cover. The dashed line circle indicates the stopper extending from the slide surface.
Figure 13:
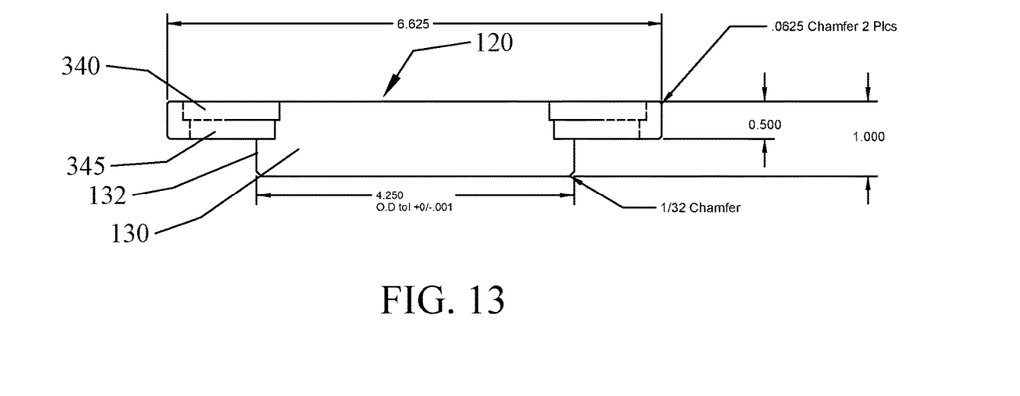
FIG. 13 is a cross-section taken along line F'-F' in FIG. 12, which shows the stopper located between the radially tapered grooves in the valve cover.
Figure 14:
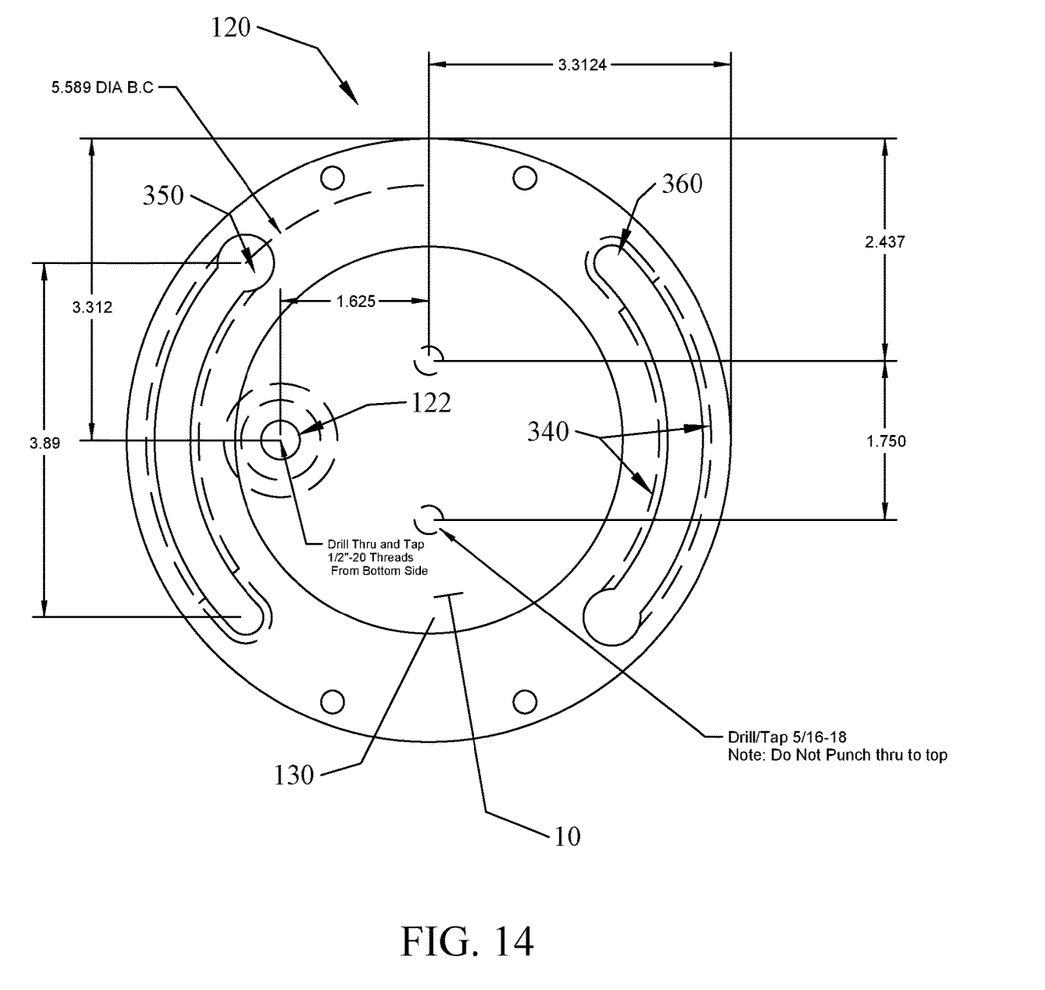
FIG. 14 is a bottom plan view of the valve cover showing the stopper between the radially tapered grooves in the valve cover. Also shown are the attachment openings in the valve cover for attachment of a side handle.

The air release valve 100 of the subject invention comprises a valve cover 120 that is operably connected to a valve body 200, as seen in FIGS. 1, 2, and 3. The valve cover has a proximal side 5 to which at least one handle 124 can be fixedly attached across the proximal end 5 or, alternatively, extending over a radial edge 15 of the valve cover. In certain instances, it can be advisable or preferable for the valve cover to be locked in place, inhibiting removal. In one embodiment, at least one locking flange 128 is arranged on the valve body in alignment with at least one handl, a non-limiting example of which is shown in FIG. 11. A locking mechanism, such as a padlock, can be utilized to secure the handle to the locking flange. For example, as shown in FIG. 11, the handle and locking flange can have alignable holes 129 through which a padlock can be attached.

Figure 5A:
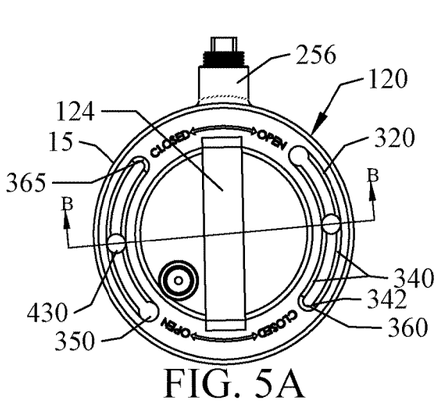
FIG. 5A is a top plan view of an air release valve cover that incorporates an embodiment of quick release mechanism of the subject invention. In this view, the guide is shown on the parallel tracks.
Figures 5B, 5C, 6B, 6C:
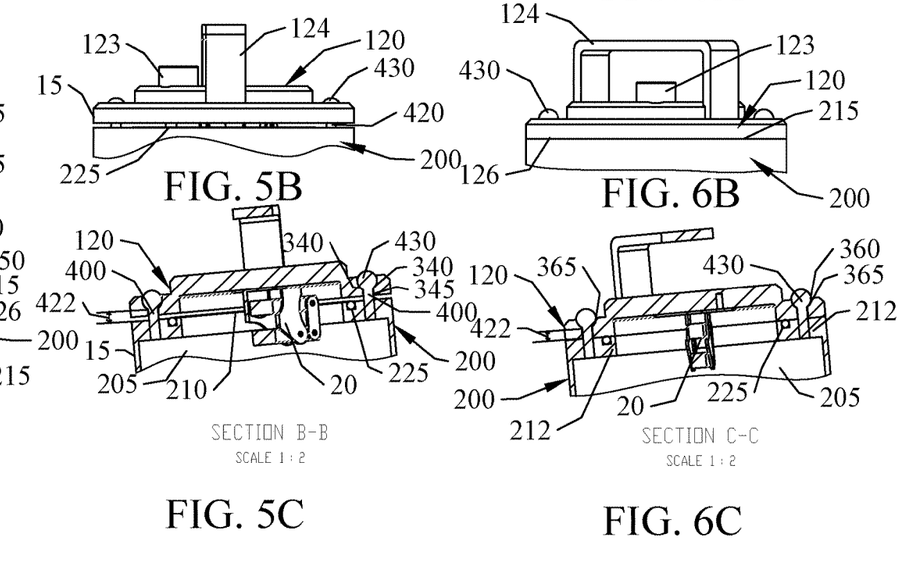
FIG. 5B is a partial elevation view of the air release valve in FIG. 5A. In this view the valve cover and valve body are shown closer together than in FIG. 4B, as the guide slides on the parallel track.
FIG. 5C is a cross-section taken along line B-B in FIG. 5A.
FIG. 6B is a partial elevation view of the air release valve in FIG. 6A. In this view the valve cover and valve body are shown with the seal formed between the sealing surface and the slide surface with the recessed compression seal.
FIG. 6C is a cross-section taken along line C-C in FIG. 6A.
Figure 6A:
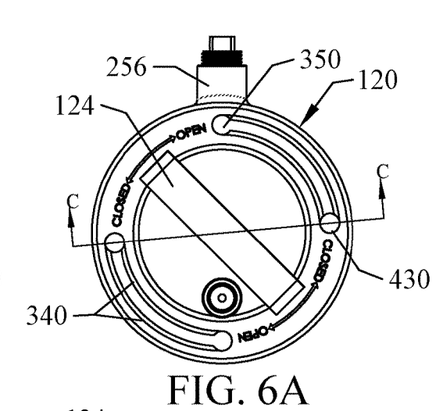
FIG. 6A is a top plan view of an air release valve cover that incorporates an embodiment of a quick release mechanism of the subject invention. In this view, the guide is shown in the locking pocket.

A sealing surface 126 on the distal side 10 of the valve cover can be positioned adjacent to or in close proximity to a valve body 200 slide surface 215 with a recessed compression seal 225, an example of which can be seen in FIGS. 6A, 6B, and 6C. In one embodiment, the slide surface and the sealing surface are complimentary, such that they can be cooperatively engaged when the air release valve is assembled and disassembled. In a particular embodiment, an example of which is shown in the Figures, the slide surface and the sealing surface are flat, smooth, and substantially parallel surfaces, that can be brought into contact when the air release valve is assembled and disassembled.

Figure 7A:
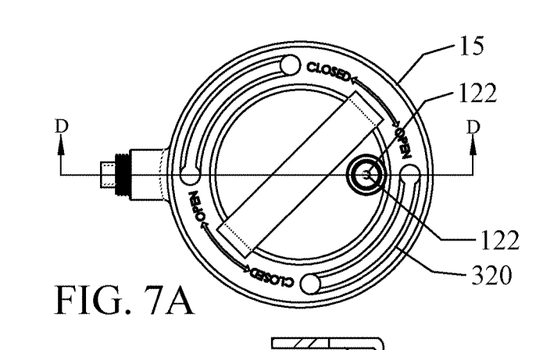
FIG. 7A is a top plan view of an air release valve that incorporates an embodiment of a quick release mechanism, according to the subject invention.
Figures 8A, 8B:
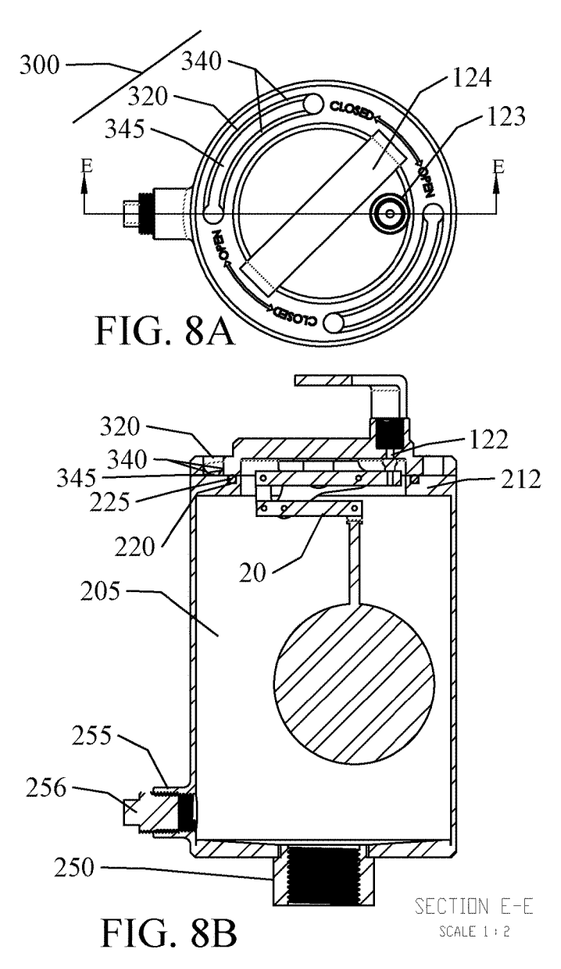
FIG. 8A is a top plan view of an air release valve that incorporates an embodiment of a quick release mechanism, according to the subject invention.
FIG. 8B is a cross-section taken along line E-E in FIG. 7A. In this view, the linkage mechanism is shown closing the exhaust orifice.

The valve cover can further have an exhaust orifice 122 that communicates the proximal end with the distal end of the valve cover to form a passage between the interior 205 of the valve body and the proximal end of the exhaust orifice. The proximal end 5 of the exhaust orifice can further comprise an exhaust vent 123 to which a hose or other similar apparatus can be attached when flushing the air release valve, as discussed below. In one embodiment, a diameter of the exhaust vent is larger than a diameter of the exhaust orifice, an example of which is shown in FIGS. 7A and 8A. In a more particular embodiment, the diameter of the exhaust vent is larger than the diameter of the exhaust orifice by at least 1x, 2x, 3x, 4x, 5x, 6x, 7x, 8x, 9x, 10x, and/or a diameter between any two of the listed values. The distal end of the orifice can engage and disengage with a plug located on the compound lever of the linkage mechanism 20, that inserts through the valve body opening 210 into the valve body interior 205, to close and open the exhaust orifice, respectively, as dictated by the amount of air in the air release valve. The dimensions of the exhaust orifice, including the diameter, can vary depending on the application of the air release valve, air pressure of air and gases released from the valve body, flushing requirements, material utilized for the valve release cover, and other factors known to those with skill in the art. In one embodiment, the exhaust orifice 122 has a diameter suitable for 150 psi working pressure.

Figure 7B:
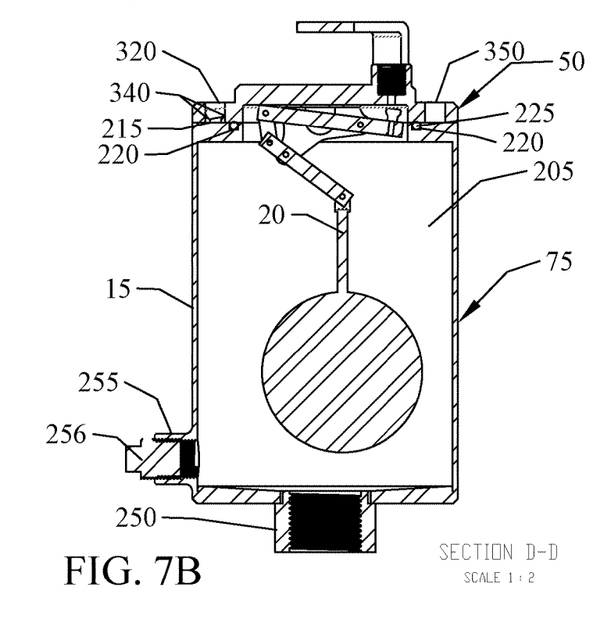
FIG. 7B is a cross-section taken along line D-D in FIG. 7A. In this view, the linkage mechanism is shown opening the exhaust orifice.

The valve body 200 has an interior 205 in which the linkage mechanism 20 resides, as shown, for example, in FIGS. 7B and 8B. The linkage mechanism utilized with embodiments of the subject invention can be any conventional linkage mechanism utilized with air release valves. Linkage mechanisms usually comprise some type of compound lever that is rotationally attached to the distal end 10 of the valve cover, with the plug configured on the compound lever to control the opening and closing of the exhaust orifice, as described above. At the distal end 10 of the linkage mechanism is a float that operates the compound lever, just as in conventional air release valves. The linkage mechanism is arranged in the valve body interior and controls the exhaust orifice through the valve body opening 210.

At the proximal end of the valve body 200 and the valve body interior 205 there can be a sliding surface 215 around the valve body opening 210. Within the sliding surface there can be a recess 220 that encircles the valve body opening 210 and valve body interior 205, as shown, for example, in FIGS. 4C, 5C, 6C, 7B and 8B. A compression seal 225 can be arranged within the recess, so that it can extend above the sliding surface. When the valve cover 120 is removably connected to the valve body, the compression seal is deformed by being compressed between the sliding surface 215 and the sealing surface 126 of the valve cover. In one embodiment, the sliding surface is on a proximal end 5 of an overhang 212.

Compression seals are commonly used to provide a seal, usually between two solid or rigid surfaces. The material employed for a compression seal can depend upon numerous factors known to those with skill in the art. Ideally, a compression seal utilized with the air release valve 100 of the subject invention has a durometer that allows the compression seal to form an air-tight seal between the valve cover and the valve body and exert a sufficient upward force against the valve cover, to retain a shoulder piece within a locking pocket, as discussed below. In a specific embodiment, a compression seal utilized with a modified air release valve embodiment of the subject invention comprises Nitrile rubber, also referred to as Buna-N Rubber or NBR rubber.

Figure 10:
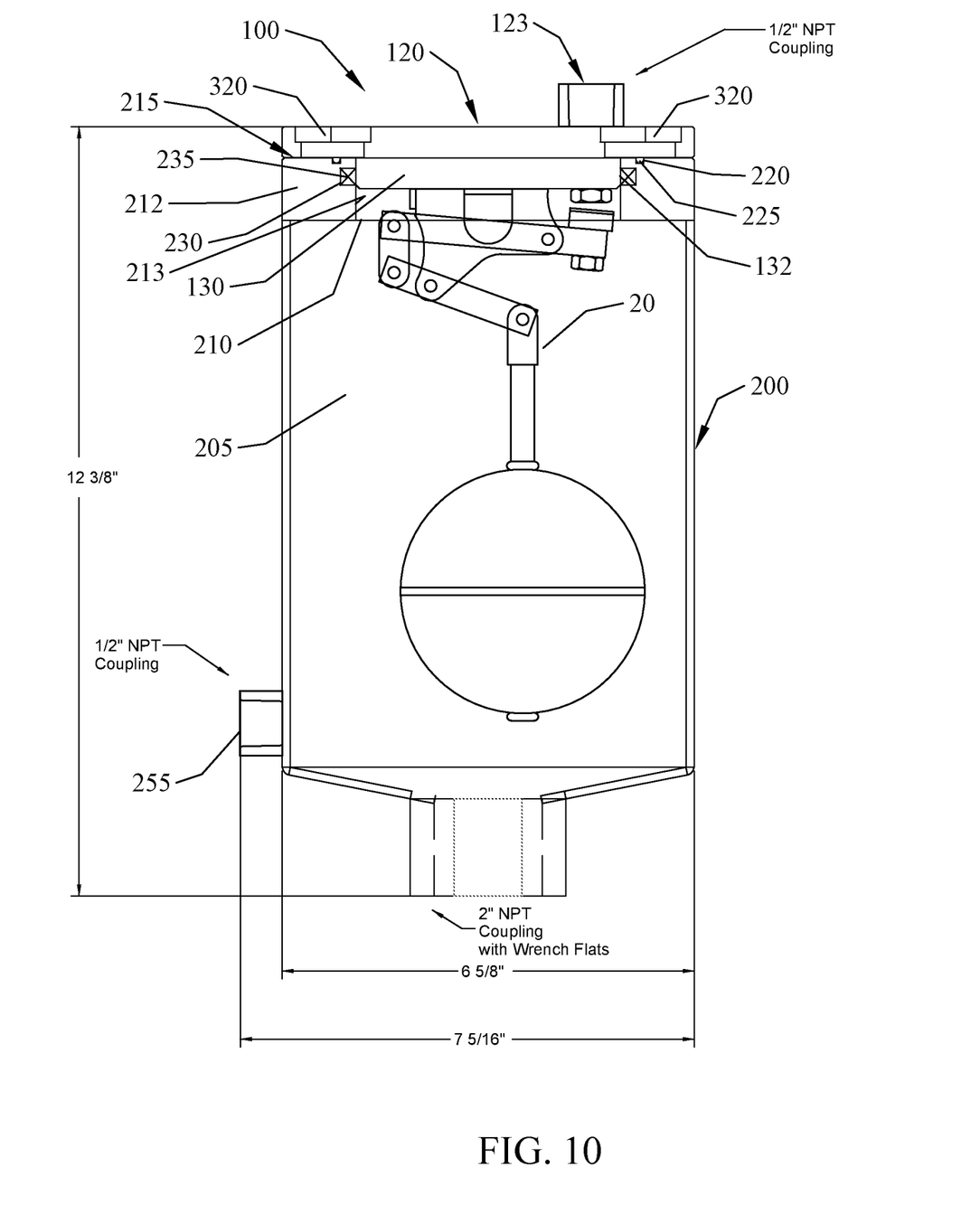
FIG. 10 is a front cross-sectional view of an alternative embodiment of the air release valve, according to the subject invention, that utilizes a stopper extending from the sealing surface of the valve cover that engages with a pressure seal in the shoulder of the valve body.

In another embodiment, overhang 212 around the proximal end 5 of the valve body opening 210 as shown, for example, in FIGS. 1, 4C, 6C, 8B, and 10 has an inner wall 213, an example of which is shown in FIGS. 1 and 10. In one embodiment, the inner wall has a smooth surface. In a further embodiment, the valve cover 120 has a stopper 130 that extends from the distal end 10 of the valve cover 120 between the radially tapered grooves 320, discussed below, to be inserted into the valve body. In a further embodiment, the linkage mechanism 20 can be operably attached to the distal end 10 of the stopper, an example of which is shown in FIG. 10. The stopper can have a sealing wall 132 with a diameter that, when inserted into the valve body opening, forms a friction fit with the outer wall 213 of the overhang 212.

In another embodiment, there is a recess 213 in and around the inner wall 213 of the overhang 212 with a depth and circumferential shape for receiving a side seal 235. The side seal can inhibit the passage of fluid between the outer wall 213 and the sealing wall 132 of the stopper 130. In one embodiment, the side seal is a pressure seal. In a more specific embodiment, the side seal is a U-cup seal or similar type of pressure seal, as known in art. A U-cup seal can be directed towards the valve body interior 205, such that pressure from within the valve body interior exerted on the seal expands the U-cup seal against the recess 213 and the stopper to inhibit fluid passage. In an alternative embodiment, the side seal 235 is a compression seal that is compressed between the recess and the stopper when the valve cover is placed over the valve body. Additional side seals can also be utilized with embodiments of the subject invention.

Occasionally, air release valves are at least partially disassembled in the field. They must be flushed periodically, components must be replaced, and other issues can arise that require removing the valve cover to access the linkage mechanism or the valve body interior. The embodiments of the subject invention provide a unique and advantageous quick release mechanism 300 for easily removing a valve cover 100 by hand and without additional tools. The quick release mechanisms of the subject invention employ cooperating components that are built-in to the air release valve cover and valve body. In one embodiment, there is at least one quick release mechanism arranged on an air release valve. In more preferred embodiments, there are at least two, oppositely arranged, quick release mechanisms on an air release valve. If additional quick release mechanisms are used it can be preferable for them to be arranged equidistant from each other, so that an even pressure can be applied to the compression seal 225.

A quick release mechanism 300 operates to align the valve cover on the valve body and when executed by hand rotating, the valve cover will cause the sealing surface 126 to deform the recessed compression seal sufficiently to form an air-tight seal between the valve cover and the valve body. The radially tapered grooves can be configured to rotate in a clockwise or counterclockwise direction to attach the valve cover to the valve body and create a seal, which will require the opposite direction of rotation to break the seal and/or remove the valve cover. The Figures illustrate embodiments having a radially tapered grooves that require clockwise rotation to create a seal with the compression seal. Radially tapered grooves configured to rotate in a counterclockwise direction to create a seal with the compression seal are also within the scope of the subject invention.

A quick release mechanism 300 can comprise a guide 400 fixedly attached to and extending proximally from the slide surface 215 of the valve body 200. In one embodiment, a guide is located more radially distant, or closer to a radial edge 15 of the modified air release valve 300 than are the recess 220 and compression seal. In other words, the recessed compression seal is closer to the valve body opening 210 than a guide. FIGS. 1, 4B, 4C, 5B, and 5C show a non-limiting example of a guide on the slide surface. The guide can comprise a post 420 that is fixedly attached to extend above the slide surface and a shoulder piece 430 fixedly attached at about the proximal end of the post. As will become apparent, the post height 422, which is the distance between the slide surface 215 and the shoulder piece, is functionally related to the taper and/or length of the parallel tracks 340 and can be critical for ensuring that the shoulder piece can engage with or lodge within the locking pocket to form a proper seal with the compression seal. In one embodiment, the post height 422 is approximately equivalent to the maximum taper height 342, which is the distance between the between the sealing surface 126 and the top of the taper A1-b, just before the locking pocket 360. FIGS. 1, 5C and 6C illustrate an example of post height 422. The compression seal and the durometer of the material thereof are also functionally related to the locking pocket in the shoulder piece is retained to hold the valve cover in place on the valve body.

Another component of a quick release mechanism 300 is a radially tapered groove 320 within the valve cover 120. A radially tapered groove operates cooperatively with the guide 400 to bring the sealing surface 215 adjacent to the slide surface 215 and the compression seal 225. In one embodiment, a radially tapered groove is an elongated curved, or semi-circular opening through the valve cover. Within the opening there can be two comparably curved, parallel tracks 340 that define a slot 345 therebetween. The slot can open onto and can be continuous with the sealing surface, as seen for example in FIGS. 7A, 7B, 8A, and 8B. The two curved, parallel tracks can partially enclose the elongated curved opening, so that there is a narrower slot between the parallel tracks, which can be seen, for example, in FIGS. 4A, 5A, and 6A. The radially tapered groove can be located closer to the radial edge 15 than the recess 220, as shown, for example, in FIGS. 1, 4C, 5C, 6C, 7B, and 8B. In a more specific embodiment, the radius R1, as measured to the center of the slot 345 of the radially tapered groove is approximately equivalent to the radius R2, as measured to the center of the post 420 on the valve body, as indicated in FIG. 7A. The approximate equivalence in radii can ensure that when the guide is engaged with the radially tapered groove, the valve cover is properly aligned with the valve body to form the seal.

To further ensure that the valve cover 100 aligns with the valve body 200, the post 420 of the guide 400 can have a diameter that allows the post to slide within the slot 345, with the shoulder piece 430 able to slide on the parallel tracks, with a minimum clearance between the post and the parallel tracks. In other words, the post can slide longitudinally in or along the length of the slot, but is laterally inhibited or has minimal lateral (side-to-side) motion capability in the slot. The post can have any circumferential shape suitable for sliding within the slot, including, but not limited to, round, oval, square, triangular, rectangular, or some combination thereof. Likewise, the shoulder piece can have any circumferential or three-dimensional shape capable of sliding on the parallel tracks 340 and is, preferably, wider than or has a diameter that is larger than that of the post. The shoulder piece can contact the parallel tracks during rotation of the valve cover to apply pressure against the parallel tracks and force the valve cover downward towards the valve body and the compression seal. It can be beneficial for the shoulder piece to have a shape that minimizes friction with the parallel tracks and facilitates sliding on the parallel tracks. In one embodiment, the post is cylindrical, with a circular circumference. In a further embodiment, the shoulder piece has some portion thereof that contacts the parallel tracks that is spherical or semi-spherical, such that a spherical portion contacts and slides on the parallel tracks.

Figure 4A:
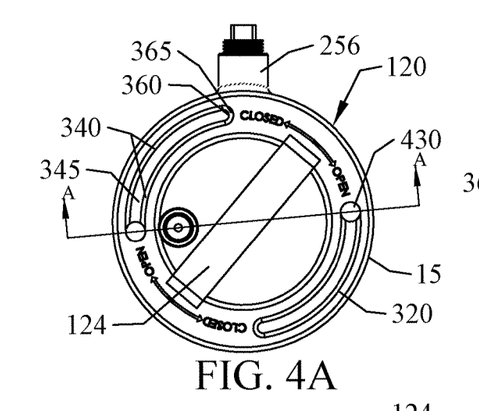
FIG. 4A is a top plan view of an air release valve that incorporates an embodiment of a quick release mechanism of the subject invention. In this view, the guide is shown in the socket.
Figures 4B, 4C:
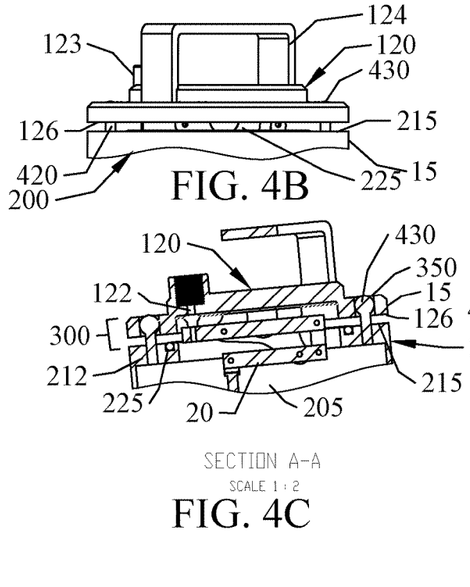
FIG. 4B is a partial elevation view of the air release valve in FIG. 4A. In this view the valve cover and valve body are separated, but the guide is in the socket.
FIG. 4C is a cross-section taken along line A-A in FIG. 4A.

At one end of the radially tapered groove 320, the parallel tracks 340 end at a socket 350 and the slot 345 therebetween opens into the socket. The socket can open onto the sealing surface 126 of the valve cover and can further have dimensions and a shape that are complimentary to the guide 400 and facilitates insertion of the shoulder piece 430 through the sealing surface and into the socket. The valve cover can be place over the valve body with the guides inserted into the sockets. FIGS. 1, 2, and 4C illustrate this process. At the end of the taper A1-b at the top of the parallel tracks in the radially tapered groove, is a locking pocket 360 and the slot 345 opens onto the locking pocket. The locking pocket 360 is also open to the sealing surface but does not permit the guide to pass through the sealing surface. In one embodiment, there can be a seat 365 formed around or otherwise arranged inside the locking pocket that is arranged below, lower than, or distal to the end of the taper A1-b. The shoulder piece can slide into the locking pocket and lodge on or drop down onto the seat where it is temporarily captured and held in place. In an alternative embodiment, at the end of the taper A1-b, the parallel tracks dip downwards or descend at the end of the radially tapered groove to form a depression in which the shoulder piece can be slidably captured, lodge, or otherwise retained. FIGS. 4A, 5A, and 6A illustrate an example of this embodiment. In a further embodiment, a portion of the shoulder piece 430 is captured or retained within the locking pocket.

When the shoulder piece is at the maximum track height 342, the compression seal is maximally compressed against the sealing surface. In this position, the sealing surface 126 of the valve cover 120 can be in contact with the slide surface 215 of the valve body 200. When the shoulder piece 430 slides into the locking pocket 360, the compression seal is no longer maximally compressed and can expand. Due to the durometer of the compression seal material, expansion of the compression seal exerts force against the sealing surface that translates to the locking pocket 360 and the guide 400 to inhibit the shoulder piece from sliding out of the locking pocket. This can cause a separation between the valve cover and the valve body approximately equivalent to the distance between the end of the taper A1-$b$ and the distal end 10 of the locking pocket 360. Thus, the valve cover is raised above the valve body. FIGS. 2, 5A, and 6C show non-limiting examples of a locking pocket. In one embodiment, the distance between the valve cover 120 and the valve body 200, when the shoulder piece is in the locking pocket and a seal is formed, is at least 0.05 mm, 0.06 mm, 0.07 mm, 0.08 mm, 0.09 mm, 0.1 mm, 0.11 mm, 0.12 mm, 0.13 mm, 0.14 mm, 0.15 mm, 0.16 mm, 0.17 mm, 0.18 mm, 0.19 mm, 0.2 mm and/or a distance between any two of the listed values.

In one embodiment, a portion of the shoulder piece is visible above the proximal end 5 of the valve cover, so that it can be easily discerned if the valve cover is in the "locked" position. FIGS. 3 and 6B illustrate an example of shoulder pieces that can be seen above the proximal end of the valve cover. In a further embodiment, the seat 365 in the locking pocket has a shape that is complimentary with the shape of the shoulder piece. In a still further embodiment, the portion of the shoulder piece that slides on the parallel tracks is spherical or has a curvature that minimizes contact with the parallel tracks.

Figure 9:
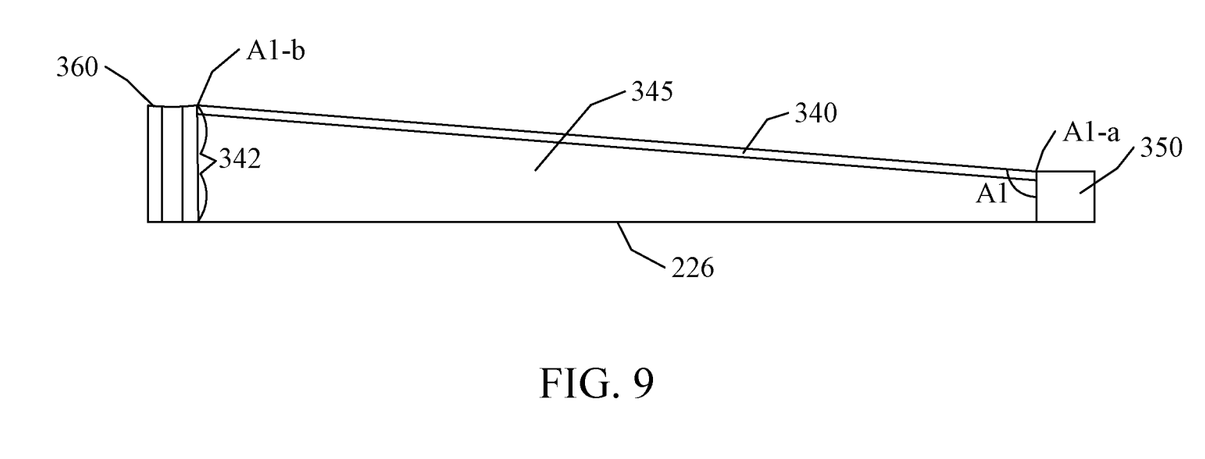
FIG. 9 illustrates an embodiment of a cross-section taken through the curved Arc Length (AL) of a radial tapered groove. In this view, the taper of the parallel tracks and the maximum track height can be seen.

Between the socket 350 and the locking pocket 360, the parallel tracks 340 have an angle of inclination Al that, with the length of the parallel tracks, determines the taper of the parallel tracks. Thus, the parallel tracks can be shorter and have a larger angle in inclination, such that the valve cover has a shorter rotation distance to achieve a seal. Conversely, the parallel tracks can be longer and have a smaller angle of inclination, such that the valve cover has a longer rotation distance to achieve a seal. The socket 350 can be located at the start of the taper A1-$a$ or at the lower end of the parallel tracks in the radially tapered groove 320. The locking pocket 360 can be at the end of the taper A1-$b$ or at the top of the parallel tracks, such that the parallel tracks form a ramp between the socket up to the locking pocket. Furthermore, the depth of the slot increases and becomes deeper between the parallel tracks becomes deeper between the parallel tracks until it has a depth, between the sealing surface and the end of the taper A1-$b$ approximately equivalent to the post height 422 of the guide 400. FIG. 9 illustrates a non-limiting example of tapered parallel tracks with an angle of inclination Al that creates a taper between the socket 350 and the locking pocket 360. In one embodiment, the angle of inclination A1 is at least 3°, 4°, 5°, 6°, 7°, 8°, 9°, 10°, 11°, 12°, 13°, 14°, 15°, 16°, 17°, 18°, 19°, and/or 20° or an angle of inclination Al that is between any two of the listed values. In a particular embodiment, the angle of inclination of parallel tracks is approximately 5°. In more specific embodiment, the angle of inclination, to the horizontal, of the parallel tracks is 5.24°. In a further embodiment, the arc length (AL) of a radially tapered groove, which is the distance between a center of the socket 350 and a center of the locking pocket 360 is equal to a rotational distance, i.e., the distance that the valve cover rotates or turns to engage the shoulder piece with the locking pocket, of approximately 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180°, and/or a length between any two of the listed values.

The embodiments of a modified air release valve 100 of the subject invention can have a valve body 200 similar to conventional air release valves used in industry. The advantage of the quick release mechanism 300 used with the modified air release valve is that it allows the valve cover 120 to be quickly and easily replaced in the field. This allows access to the valve body interior 205 more easily than air release valves with bolted-on valve covers. Maintenance procedures, such as flushing and cleaning of the valve body interior can to be more easily accomplished with the modified air release valve by removing the valve cover. This eliminates the necessity of additional external flushing mechanisms and ball valves that are typically used with conventional air release valves to avoid removing the valve cover.

Embodiments of the valve body 200 of the subject invention can have a valve connector 250 at or near the distal end 10 of the valve body. The valve connector can be used to attach the modified air release valve to a main pipeline. For example, an isolation ball valve can be attached to the valve connector 250 and used to connect the modified air release valve 300 to the main pipeline. During maintenance, the isolation ball valve can be closed, thereby isolating the modified air release valve from the pipeline pressure and flow. There can be water that remains in the valve body 200 and there is also a potential for a small amount of entrained pressure. In a further embodiment, the valve body can have a connection 255 for a drain plug 256.

Maintenance personnel can open the drain plug to both relieve any residual pressure and to drain any remaining water. The drain plug can be located anywhere on the valve body and is, preferably, at or near the distal end 10 so allow draining as much water or other material as possible. In one embodiment, the valve body has an ANSI/ASME B107.1 Hexagonal 2" NPT inlet connection in which a drain plug 256 can be disposed. Once the valve body has been drained and cleared of pressure, the valve cover 120 can be opened and removed along with the entire internal linkage mechanism.

Removing the valve cover 120 from a modified air release valve 100 can be initiated by pressing down on the valve cover, such as with the handle 124, to compress the compression seal enough to raise or dislodge each shoulder piece 430 on a guide 400 out of the respective locking pocket 360 in each radially tapered groove 320. While the shoulder pieces are raised, the valve cover can be rotated, again for example, by using the handle to place the shoulder pieces on the end of the taper A1-$b$ at the top of the tapered parallel tracks 340. Once the shoulder pieces are on the parallel tracks it is no longer necessary to continue downward pressing on the valve cover, but it can be beneficial to raise the valve cover while continuing to rotate the valve cover. This will raise the valve cover away from the compression seal 225 and the slots 345 will direct the guides to the sockets 350. When the guides are in the sockets, the valve cover can be completely raised and removed from the valve body by pulling vertically to also remove the linkage mechanism 20 removably attached to the distal end 10 of the valve cover from within the valve body interior 205.

Replacing the valve cover on the valve body requires aligning the valve cover, for example, by using the handle, with the sockets in the radially tapered grooves over the guides on the slide surface of the valve body. When lined up, the valve cover can be moved downward to insert the guides into the sockets. When the guides are inserted, the valve cover can be rotated, in a direction opposite to the direction of rotation used to remove the valve cover, while simultaneously pulling upwards sufficiently to maintain the shoulder pieces on the tapered parallel tracks. This can also inhibit the sealing surface from contacting the compression seal until necessary to form the seal. Continued rotation slides the shoulder pieces on the tapered parallel tracks causing the valve cover to simultaneously move towards the valve body and the compression seal. As the shoulder pieces near the end of the taper of the parallel tracks, the sealing surface gets closer to the compression seal. When the shoulder pieces reach the top of the parallel tracks and the end of the taper A1-b, the sealing surface will be in operable contact with the compression seal and the slide surface. The valve cover can be rotated until the shoulder pieces engage with or drop into locking pocket, which will maintain the proximity of the surfaces. The flexible compression seal can exert a continuous upward force, as it tries to expand, against the sealing surface, which translates to the locking pocket and holds the shoulder pieces in place.

There are many devices that require forming a seal between two surfaces, particularly an air-tight seal. Air release valves are commonly used on fluid pipelines to inhibit air lock by drawing-off and releasing air and gases in the fluid and require an air-tight seal between the valve cover and the valve body. It is necessary to periodically perform maintenance on air release valves. Air release valves with built-in flushing mechanisms require external hoses, ball valves, and other equipment seal the air release valve from the main fluid line and then water is injected into the air release valve in one opening and removed through another until the valve interior is clean. Other air release valves are maintained by removing the valve cover, which can entail special tools to remove and replace bolts around the outside of the valve cover. The quick release mechanism utilized with the modified air valve embodiments of the subject invention provide a new, quicker, and more accurate method for detaching and reattaching a valve cover by hand and without tools. This can make maintenance easier and can ensure a proper, air-tight seal when the valve cover is replaced, all without special tools.

All patents, patent applications, provisional applications, and other publications referred to or cited herein are incorporated by reference in their entirety, including all figures and tables, to the extent they are not inconsistent with the explicit teachings of this specification. Additionally, the entire contents of the references cited within the references cited herein are also entirely incorporated by reference.

The examples and embodiments described herein are for illustrative purposes only and that various modifications or changes in light thereof will be suggested to persons skilled in the art and are to be included within the spirit and purview of this application.

The invention claimed is:

1. A quick release mechanism for fastening together the surfaces of two components, comprising:
   a guide that extends from a slide surface of a first component, the guide comprising a post and a shoulder piece arranged on the post having a diameter that is wider than a diameter of the post;
   a radially tapered groove in a second component comprising radially tapered parallel tracks that define a slot that is narrower than the shoulder piece within the radially tapered groove, the slot being open to a distal sealing surface of the second component, and the tapered parallel tracks having a start at a bottom of the taper at one end of the slot and an end at a top of the taper at the opposite end of the slot;
   a socket located at the start of the taper that is continuous with the slot and at least as wide as the shoulder piece, wherein the guide passes through the sealing surface and into the socket to engage the shoulder piece with the tapered parallel tracks of the radially tapered groove when the second component is rotated;
   a locking pocket located at the end of the taper that is continuous with the slot and at least as wide as the shoulder piece; and
   a seat arranged inside the locking pocket, wherein the shoulder piece lodges in the seat to inhibit the guide from passing through the sealing surface when the second component is rotated to lodge the guide in the locking pocket.

2. The quick release mechanism, according to claim 1, further comprising a recess in the slide surface that receives a compression seal.

3. The quick release mechanism, according to claim 1, wherein the taper of the parallel tracks has an angle of inclination between approximately 2° and approximately 20°.

4. The quick release mechanism, according to claim 1, wherein the radially tapered groove has a length equivalent to a rotational distance of approximately 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180° and/or a length between any two of the listed values.

5. The quick release mechanism according to claim 1, wherein the first component further comprises an overhang, with the sliding surface thereon.

6. The quick release mechanism according to claim 5, further comprising an inner wall on the overhang with a recess therein that receives a side seal.

7. The quick release mechanism according to claim 6, further comprising a stopper that extends from the distal sealing surface of the second component, the stopper comprising a sealing wall that forms a seal with the side seal when the second component is rotated to lodge the shoulder piece with the seat inside the locking pocket.

8. The quick release mechanism according to claim 7, wherein the first component is a valve cover of an air release valve and the second component is a valve body of an air release valve.

9. A method for fastening the facing surfaces of two components, the method comprising:
   obtaining two components comprising a quick release mechanism, according to claim 1;
   positioning the sealing surface of the second component over the slide surface of the first component;
   moving the second component towards the first component until the guide enters the socket;
   rotating the second component to engage the shoulder piece with the parallel tracks at the start of the taper;
   continuing to rotate the valve cover to move the valve cover closer to the valve body and slide the shoulder piece on the parallel tracks until the shoulder piece is at the end of the taper of the parallel tracks; and
   rotating the valve cover to lodge the shoulder piece on the seat of the locking pocket, thereby fastening the second component to the first component with the sealing surface facing the sliding surface.

10. The method according to claim 9, further comprising:
   rotating the second component to dislodge the shoulder piece from the seat of the locking pocket onto the end of the parallel tracks;
   further rotating the second component to slide the shoulder piece over the parallel tracks to the start of the parallel tracks;
   positioning the guide into the socket; and
   removing the guide from the socket by moving the second component away from the first component.

11. The method according to claim 10, wherein the first component further comprises a recess in the slide surface for retaining a compression seal and the method further comprises pushing the second component against the first component to compress the compression seal and dislodge the shoulder piece from the seat of the locking pocket.

12. The method according to claim 11, wherein the seal in the recess applies force against the sealing surface of the second component to form a seal with the sealing surface and push the second component a distance from the first component that is sufficient to lodge the shoulder piece in the seat of the locking pocket.

13. The method according to claim 12, wherein the first component and the second component comprise a valve body and valve cover, respectively, of an air release valve.

14. A quick release mechanism for fastening a valve cover to a valve body of an air release valve, the quick release mechanism comprising:
 a guide that extends from a slide surface of the valve body, the guide comprising a post and a shoulder piece arranged on the post that has a diameter wider than a diameter of the post;
 a radially tapered groove in the valve cover comprising radially tapered parallel tracks that define a slot within the radially tapered groove, the slot being open to a distal sealing surface of the valve cover, and the parallel tracks having a start at a bottom of the taper at one end of the slot and an end at a top of the taper at the opposite end of the slot;
 a socket at the start of the taper that is continuous with the slot and at least as wide as the shoulder piece, wherein the guide passes through the sealing surface and into the socket to engage the shoulder piece with the parallel tracks of the radially tapered groove when the valve cover is rotated;
 a locking pocket located at the end of the taper that is continuous with the slot and at least as wide as the shoulder piece; and
 a seat arranged inside the locking pocket, wherein the shoulder piece lodges with the seat to inhibit the guide from passing through the sealing surface when the valve cover is rotated to engage the guide on the valve body with the locking pocket.

15. The quick release mechanism, according to claim 14, further comprising a recess in the slide surface that receives a compression seal.

16. The quick release mechanism, according to claim 14, wherein the taper of the parallel tracks has an angle of inclination between approximately 2° and approximately 20°.

17. The quick release mechanism, according to claim 14, wherein the radially tapered groove has a length equivalent to a rotational distance of approximately 45°, 50°, 55°, 60°, 65°, 70°, 75°, 80°, 85°, 90°, 95°, 100°, 105°, 110°, 115°, 120°, 125°, 130°, 135°, 140°, 145°, 150°, 155°, 160°, 165°, 170°, 175°, 180° and/or a length between any two of the listed values.

18. The quick release mechanism according to claim 14, wherein the valve body further comprises an overhang with the sliding surface thereon around an opening in the valve body.

19. The quick release mechanism according to claim 18, further comprising an inner wall on the overhang with a recess therein that receives a side seal.

20. The quick release mechanism according to claim 19, further comprising a stopper that extends from the distal sealing surface of the valve cover, the stopper comprising a sealing wall that forms a seal with the side seal when the valve cover is rotated to lodge the guide on the valve body in the seat in the locking pocket.

* * * * *